Figure 1:
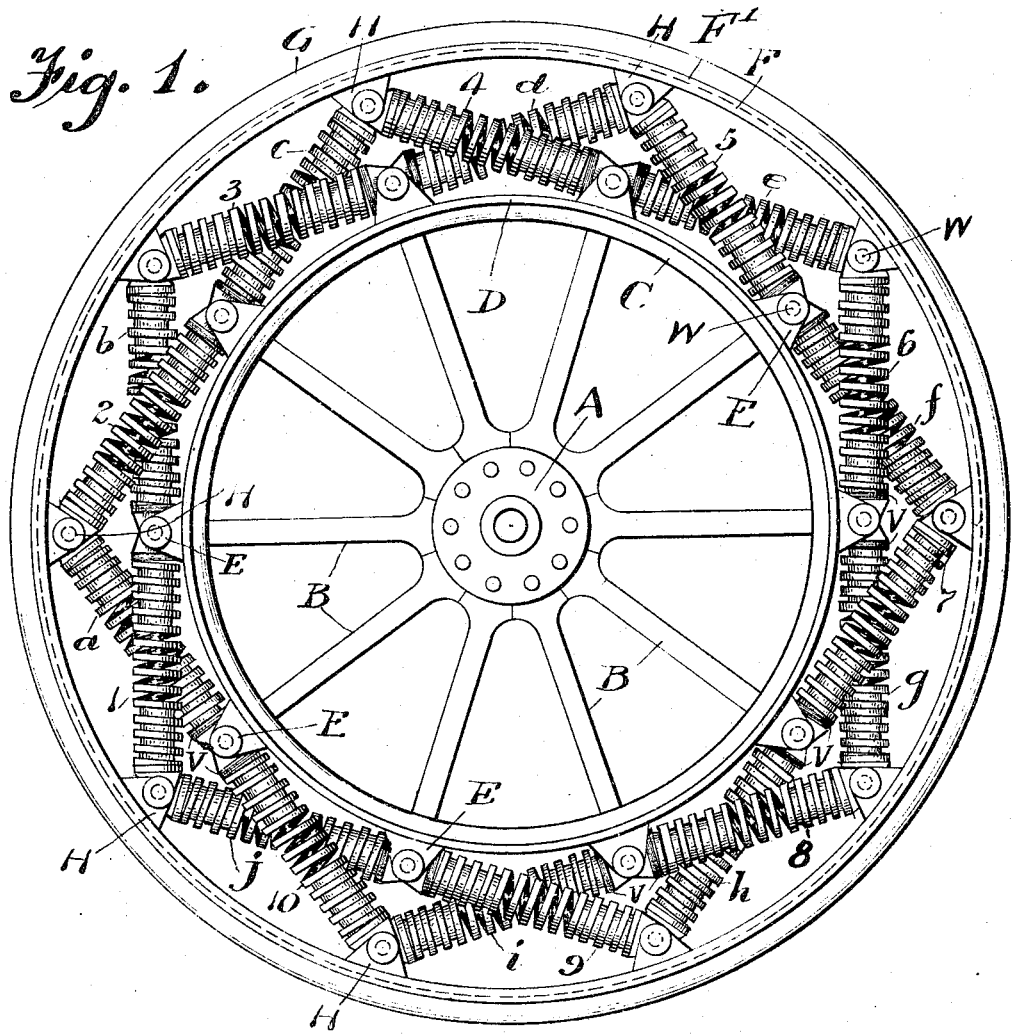

R. GRAHAM-WOODWARD.
SPRING WHEEL.
APPLICATION FILED AUG. 18, 1909.

981,414.

Patented Jan. 10, 1911.

2 SHEETS—SHEET 1.

WITNESSES:
Clara Hohenstein
Ray T. Ernst

Robert Graham-Woodward
INVENTOR

BY Singh Bros.
ATTORNEYS.

R. GRAHAM-WOODWARD.
SPRING WHEEL.
APPLICATION FILED AUG. 18, 1909.

981,414.

Patented Jan. 10, 1911.

2 SHEETS—SHEET 2.

Witnesses:
Clara Hohenstein
Ray T. Ernst.

Robert Graham-Woodward
Inventor
By his Attorneys Knight Bros.

UNITED STATES PATENT OFFICE.

ROBERT GRAHAM-WOODWARD, OF NEW YORK, N. Y., ASSIGNOR TO HERCULES SUSPENSION TIRE COMPANY, OF NEW YORK, N. Y., A CORPORATION OF NEW YORK.

SPRING-WHEEL.

981,414.

Specification of Letters Patent.   Patented Jan. 10, 1911.

Application filed August 18, 1909.   Serial No. 513,454.

*To all whom it may concern:*

Be it known that I, ROBERT GRAHAM-WOODWARD, a citizen of the United States, residing in the borough of Manhattan, city, county, and State of New York, have invented certain new and useful Improvements in Spring-Wheels, of which the following is a specification.

The object of my invention is to produce a simple and effective resilient wheel of great strength having renewable parts which can be substituted for the pneumatic tired wheels now in general use for motor cars and other vehicles.

In producing my improved wheel, I have had in mind as the main considerations the imitation so far as practicable of the resiliency of the pneumatic tired wheel now in use, while at the same time producing a wheel structure of greater strength and less liability to injury under ordinary working conditions. I have also had in mind the production of a wheel in which the spring members are mounted between the wheel rim members in normal or untensioned condition with a view of securing the greatest efficiency of the springs under working conditions and simplifying the renewal of spring parts in case of accidental breakage. In my improved wheel the parts most liable to wear and breakage can be more readily replaced than the pneumatic tire of the wheels now commonly used. Aside from these two main considerations, I have arranged the spring members of my improved wheel in such relative positions that while one half of the spring members are yieldingly sustaining the weight of the car, the other spring members are presented in opposed position to act as shock absorbers and also to avoid the objectionable teetering or up and down motion of the car. I have also made provision to effectively resist any relative lateral movement between the two rim members of the wheel under a side blow or lateral skidding strain, by mounting the spring members between the main or inner wheel member and the outer wheel rim in two tangential series arranged in parallel vertical longitudinal planes of the wheel, the spring member of one series in one plane alternating circumferentially with the spring members of the other series in the other plane, so that each spring member of one series will be paired with, and intersect or extend across one spring member of the other series. Each pair of crossing spring members is made, as far as possible, self-sustaining to resist any ordinary side blow or lateral stress, and, by the engagement of the paired members, to resist any unusual strain.

More specifically, my improved spring wheel comprises an inner wheel member of ordinary construction, an outer rim member of larger diameter than the rim of the inner wheel member, and two circumferential series of spring members arranged between the two concentric rims in parallel vertical planes and connected at their opposite ends with the concentric rim members. The points of connection of the spring members with the outer surface of the inner wheel rim are preferably in approximately the same radial planes as the points of connection of the spring members with the inner surface of the outer rim member. Each spring member comprises preferably a stout cylindrical compression spring mounted and centered upon two relatively movable barrel members which are pivotally and detachably connected with the rim members.

In the preferred form of my improved wheel of the size approximating the ordinary automobile wheel of today the arrangement of the two series of spring members between the concentric rim members of the wheel is such that in viewing the completed wheel in side elevation, the two series of springs present the appearance of two interlaced or intersecting pentagonal figures with the sides of said figures extending approximately tangentially to the periphery of the inner rim member. In thus outlining said pentagonal figures by the arrangement of the spring members, it will be observed that each side of each of said figures is made up of two spring members belonging to the two different parallel series of spring members. In this form of the wheel there are ten spring members in each series. The spring members may be arranged with a greater number in each series, as in making larger wheels, and there may, if desired, be more than two parallel series of spring members by making the wheels of greater rim width.

With my improved arrangement all of the tangential spring members of one series arranged in a common vertical plane extend forwardly between the two rim members, while all of the spring members of other series extend rearwardly, considering the terms "forwardly" and "rearwardly" with relation to the rotation of the wheel.

The relatively movable guiding and supporting parts of the spring members are preferably pivotally connected with lugs or brackets on the rim members through the medium of removable pins or bolts. I prefer to mount each spring upon its support in its normal untensioned or non-compressed condition so that the greatest efficiency of the springs will be obtained and the operation of renewing the individual springs without the use of tools will be facilitated. Furthermore each member of one series is arranged directly opposed to a spring member of the other series; with the result that the rebound of each spring member is resisted by the opposing spring member acting as a shock absorber. This last named arrangement also facilitates the renewal of the springs.

In order that my invention may be fully understood, I will first describe the same with reference to the accompanying drawings, and afterward point out the novelty more particularly in the annexed claims.

Figure 2:
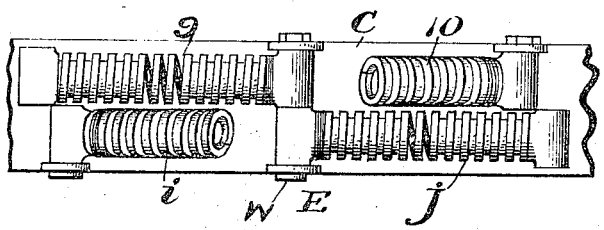
Figure 3:
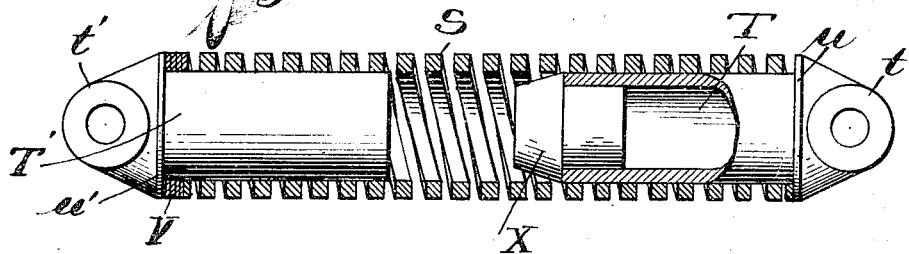

In said drawings: Figure 1 is a side elevation of a spring wheel constructed in accordance with my invention. Fig. 2 is a detail sectional plan view of a part of the wheel, omitting the outer rim and showing the connections of four adjacent spring members with the inner rim. Fig. 3 is a detail longitudinal sectional view of a detached spring member.

In constructing a spring wheel in accordance with my invention, I take a central wheel member made of the ordinary hub A, spokes B, felly C and metal rim D surrounding the felly and form upon or otherwise securely fasten to the rim D, the outwardly projecting ears, lugs or brackets E arranged in planes approximately radial to the inner wheel member and at equal distances apart around the periphery of the rim D for the attachment of the spring members. I next construct an outer metal rim F of considerably larger diameter than the inner rim D. This outer rim F is formed at its edges with external annular flanges F' to retain upon it the solid tire G formed of rubber, leather or other suitable material, to eliminate the noise that the metal rim F would otherwise make in contacting with the road. This outer rim F is also formed with a series of inwardly projecting ears, lugs or brackets H for the attachment of the spring members.

The inner and outer wheel rim members D and F, just described, are supported in spaced concentric relation and connected by a plural series of spring members which are individually pivoted at their opposite ends to brackets E and H and arranged in parallel planes in the annular space between the rims in the manner now to be explained.

The individual spring members are preferably constructed as shown in the drawings, in which each comprises a heavy cylindrical compression spring S mounted at its opposite ends upon the guiding barrel or pin members T and T', each one of which is formed with a bearing head $t$ or $t'$, and a circular spring retaining flange or collar $u$ or $u'$. If preferred an easily compressible anti-rattling spring washer V may be mounted upon one of the pin or barrel members T, T' in engagement with one end of spring S, although this latter element is not essential, as centrifugal force will ordinarily hold the inactive springs against movement upon the barrels while the wheel is running. A solid rubber cushion X may be mounted in the end of one barrel member T, T' to engage the end of the other barrel member under a great shock although the spring S will rarely, if ever, be compressed sufficiently to throw the ends of said barrel members into contact.

Each spring member is mounted between the rims D and F by pivotally connecting the bearing head $t$ with one of the outwardly projecting lugs or brackets E, and the bearing head $t'$ with one of the inwardly projecting lugs or brackets H, so that all of the spring members will be approximately tangential to the inner rim. These pivotal connections between the spring supporting and guiding members and the lugs upon the rims are preferably by means of pivot bolts W which pass through said lugs or brackets and said bearing heads and have any suitable means, such for instance as lock nuts or linch-pins, for retaining them in proper position.

With particular reference to Fig. 1 of the drawings, it will be observed that the front series of spring members arranged between the inner and outer wheel rims indicated by the reference numerals 1, 2, 3, 4, 5, 6, 7, 8, 9 and 10, all extend in the same direction with reference to the rotation of the wheel, that is, from the lugs or brackets H of outer rim F forwardly to the lugs or brackets E of the rim D, and that all of said members are in the same vertical plane, considering the wheel in upright position as when in use. It will also be observed that the rear series of spring members indicated by the reference letters $a$, $b$, $c$, $d$, $e$, $f$, $g$, $h$, $i$ and $j$ all extend from the lugs or brackets H of the outer rim F rearwardly to the lugs or brackets E of the inner rim D, and that all of this second series of spring members are in a common vertical plane parallel with the plane in which the first mentioned series of spring members is located. With this arrangement, it will further be observed that a pivot pin W connects the bearing heads t or t' of two spring members of different series to each of the ears or lugs E and to each of the ears or lugs H, this arrangement being clearly indicated in Fig. 2 of the drawings.

Considering the wheel in the position shown in Fig. 1 of the drawings, it will be clear that the weight sustained by the wheel will be borne mainly by the spring members 1 and g which are parallel with the load and that proportionally decreasing assistance will be rendered by the spring members 2 and f, 10 and h, 3 and e and 9 and i. Of these active spring members it will be observed that members 1, 2, 10, 3 and 9 are in a different vertical longitudinal plane from members g, f, h, e and i, so that the load of the wheel is always sustained by an equal number of spring members in front and rear of the vertical axis of the wheel upon opposite sides of the central vertical longitudinal plane of the wheel, thereby effectively equalizing the strain upon and resiliency of the wheel and avoiding all torsional or relative sidewise movement. It will be observed further with reference to Fig. 1 that the active spring members 1 and g, 2 and f, 10 and h, 3 and e, and 9 and i have opposed to them respectively in the nature of shock absorbers or buffers, the spring members b and 6, c and 5, a and 7, d and 4 and j and 8, so that all tendency to rebound beyond the initial position of the wheel will be prevented by the opposition of the springs equal in power to the springs carrying the weight.

It is my intention in building my wheel, to mount all the spring members upon the wheel in normal or non-compressed condition and to employ springs of sufficient relative power to present an initial resistance to practically withstand or balance the normal weight of the car and load without yielding, so that the wheel will act as a practically rigid wheel upon a smooth level road but will be capable of yielding and absorbing all shocks or blows due to inequalities or obstructions in the road since such shocks overcome the initial resistance of the springs.

While the wheel is running the centrifugal force will ordinarily hold the springs S (while inactive) outwardly against the heads of their guiding members pivoted to the outer rim, or if the rotation is too slow to effect this the light spring washers heretofore referred to will prevent the loose movement of the springs back and forth upon their supports.

In the event of any part of a spring member becoming injured or broken, it is only necessary to turn the wheel to bring the injured member in inactive position above the horizontal plane of the axle, when it will be loose and can be readily removed and a new one put in place. The simplicity of repairing broken parts without the necessity of removing the wheel or any parts thereof, other than the broken member, is considered of great importance.

The tendency of the outer rim member to "creep" with reference to the inner rim member, upon the application of driving power to the inner wheel member, is counteracted by the weight of the car acting through the active spring members supplemented by the opposed or inactive spring members. In this way my improved wheel affords a very desirable and effective resilient driving connection between the motor and traction part of the wheel in a motor driven vehicle.

By providing a plural series of spring members in parallel planes with the members of one series alternating with and crossbers of another series, the outering the members of another series, the inner rim is amply supported at all points, the inner wheel member, practically floats upon the spring members within the outer rim, and transverse strain or movement between the inner and outer rims is resisted by the spring members.

The improved arrangement equalizes the strain upon the springs, and by reason of the tangential arrangement of the individual spring members, and the pivotal connections of the spring supports with the rim members, the thrust upon the springs is always lengthwise and the greatest part of the load is supported by the spring members in vertical position and is borne by the members in succession.

What I claim is:

1. In a spring wheel, the combination of the inner and outer spaced wheel members, with two paired series of normally unstrained single acting spring members arranged in approximately parallel relation between said wheel members and serving to yieldingly support said inner wheel member within said outer wheel member.

2. In a spring wheel, the combination of the separated inner and outer wheel members, with two paired series of single acting compression spring members arranged in approximately parallel relation between said wheel members, and means loosely confining said spring members in their planes of action, said confining means permitting the compression of individual spring members upon the approach of adjacent portions of the wheel members, and leaving said spring members in loose uncompressed condition upon the separation of adjacent portions of said wheel members.

3. In a spring wheel, the combination of the spaced inner and outer wheel members, with two series of single acting normally unstrained spring members arranged in parallel vertical planes between said wheel members and serving to yieldingly support said inner wheel member within said outer wheel member, the spring members of one of said series extending in opposite directions to and paired with the spring members of the other of said series.

4. In a spring wheel, the combination of the spaced inner and outer rim members, with two series of spring members arranged in parallel vertical planes between said rim members, all of said spring members of both series extending approximately tangentially of said inner rim member, and the spring members of one series extending in opposition to and crossing or intersecting the spring members of the other series to engage therewith under transverse strain and mutually resist lateral displacement of said rim members.

5. In a spring wheel, the combination of the inner wheel member having a circular rim, the outer concentric rim member, and guiding members pivotally connected with the inner and outer rims, with two approximately parallel series of compression springs members arranged between said concentric rims, and each spring member being freely mounted in unstrained condition upon a pair of said guiding members to yieldingly support the inner wheel within the outer rim.

6. In a spring wheel, the combination of the inner and outer spaced wheel members with two paired series of spring supporting-devices arranged in parallel planes between said wheel members with one of each pair of both series connected with each of said wheel members, the adjacent members of succeeding pairs of said spring supporting-devices being connected at a common point to the inner or outer wheel member, and the connecting points upon the outer wheel member being in the same radial planes as the connecting points of the inner wheel member, and two series of normally unstrained oppositely acting springs, each one of which is freely mounted upon one pair of said spring supporting-devices.

7. In a spring wheel, the combination of the inner and outer rim members, with a plurality of spring members arranged between, and connecting said rim members, each spring member comprising a cylindrical compression spring, and two relatively movable guide pins or barrels which are pivotally connected with the inner and outer rim members respectively, said compression springs being loosely mounted upon said guide pins or barrels in normal or unstrained condition.

ROBERT GRAHAM-WOODWARD.

Witnesses:
WM. E. KNIGHT,
LAURA E. MONK.